3,075,798
LIFTER FOR MEAT AND POULTRY
Mahlon J. Smith, Niles, Mich., assignor to The Washburn Company, Worcester, Mass., a corporation of Massachusetts
Filed Oct. 13, 1960, Ser. No. 62,481
4 Claims. (Cl. 294—15)

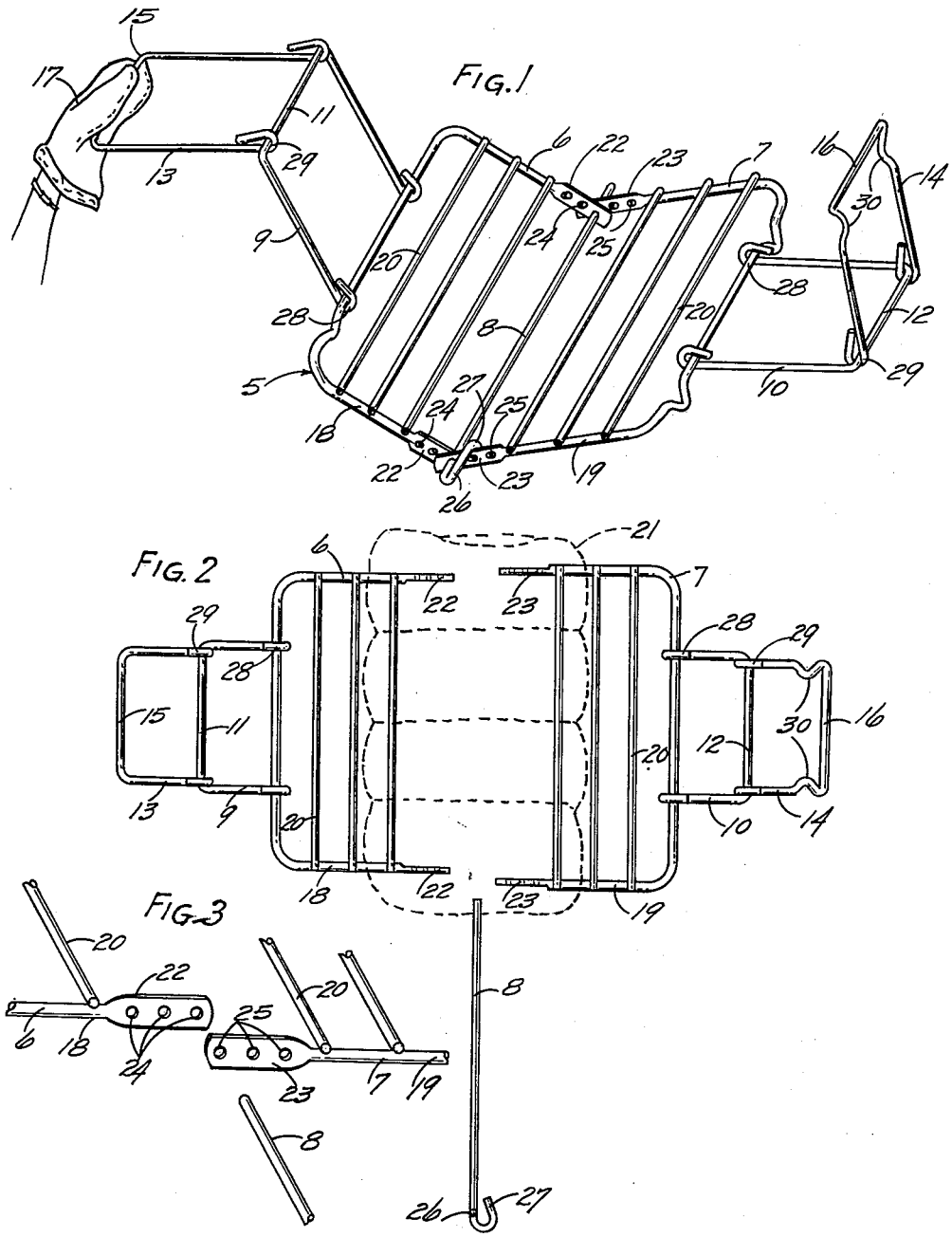

This invention relates to a lifter for meat and poultry for use in transferring the same from a roaster onto a platter or carving board.

An important feature of the present invention consists in the means with which the lifter may be adjusted to suit different meats so far as size is concerned, and the same pin that is used in making this adjustment also enables separating the two halves of the lifter and removing the same from beneath the meat after it has been placed on the platter or carving board when the pin is withdrawn, the pin having a hook formed on the handle portion provided on one end so that it can be locked in place against accidental disengagement.

The invention is illustrated in the accompanying drawing, in which—

FIG. 1 is a perspective view of a lifter made in accordance with my invention and indicating how the handle bails provided on the opposite ends are adapted to be grasped in lifting the meat out of the roaster and placing it on the platter or carving board;

FIG. 2 is a plan view on a smaller scale illustrating a roast in dotted lines and showing the halves of the lifter separated after withdrawal of the connecting pin so that the lifter can be removed easily and is not in the way and does not detract from the appearance of the platter, and FIG. 3 is a perspective detail illustrating the method of assembly and disassembly.

The same reference numerals are applied to corresponding parts in these three views.

Referring to the drawing, the flexible wire lifting device of my invention is indicated generally by the reference numeral 5 in FIG. 1 and consists of two fairly rigid, generally rectangular latticed supports or body members 6 and 7 that are detachably and adjustably pivotally connected at the middle of the device by means of a wire pin 8, these two body members having U-shaped wire bails 9 and 10, pivotally connected to their outer ends, the cross-portions 11 and 12 of which may be used as handles if the size of the roast or other meat encompassed by the device is relatively small, and otherwise, the additional U-shaped wire bails 13 and 14 which are pivotally connected to the handle portions 11 and 12 of bails 9 and 10 being used, the handle portions 15 and 16 of these bails being used in that event, as indicated for example by the mitt 17 shown in the grasping of handle 15 in FIG. 1. The body portions 6 and 7 have generally U-shaped wire frames 18 and 19 to the arms of which longitudinally extending wires 20 are welded to form supports for the meat placed in the lifter, as for example, the roast indicated in dotted lines at 21 in FIG. 2. The frame 18 is slightly shorter than the frame 19 so that the flattened inner end portions 22 provided on the arms of the frame 18 will fit easily between the similarly flattened inner ends 23 of the arms of the frame 19, as seen in FIG. 1, and the pin 8 can be entered through registering holes 24 and 25 provided in these flattened end portions, the innermost holes being used as in FIG. 1 for a large roast and the other holes being used for smaller roasts. The handle portion 26 bent at right angles to one end of pin 8 is used in manipulating the pin, and a hook 27 is formed on one end of the handle 26 to engage over one of the flattened end portions 23 as in FIG. 1 to prevent accidental disengagement of the pin from the holes.

In operation, when the pin 8 is inserted to pivotally interconnect the two body portions 6 and 7, the device appears as in FIG. 1, subject of course to adjustment of the pin 8 to other holes 24 and 25 to accommodate a smaller sized roast or fowl. Handles 11 and 12 may be used or handles 15 and 16. The lifter is laid out flat on the work area in making the necessary adjustments of the pin 8 to fit the bottom of the roasting pan, after which the meat is placed on the lifter and lowered with the lifter into the roaster, and just as easily lifted out later when the meat is done, except that the hot pads or mitts 17 will be required. Despite the rigidity of members 6 and 7, the lifter wraps around the meat readily by reason of the pivotal connection at 8 and the other pivotal connections at 28 and 29. The bent-in portions 30 on the arms of the bail 14 permit easily interconnecting bail 14 in bail 13 so that handles 15 and 16 are interlocked, making it easier to take hold of the handles when the meat is done. Sometimes, however, where a large turkey makes interconnection of the handles impossible, heavy cord may be used to interconnect the handles 15 and 16, or these handles may be fastened in a fixed relationship to one another and the meat by means of skewers. After the meat is done and has been lifted out of the roaster onto the platter or carving board, the pin 8 can be removed and the lifter is then in two disconnected halves that can be easily removed laterally from opposite sides without disturbing the meat and running any risk of rolling it off the platter or carving board onto the floor, that having been a serious objection to certain other designs of lifters available heretofore. The lifter is suitable for use with all heavy cuts of meat in lifting the same from hot roasting pans, and is ideal for roast turkey or chicken, rolled roasts, standing ribs, hams, and so forth.

It is believed the foregoing description conveys a good understanding of the objects and advantages of my invention. The appended claims have been drawn to cover all legitimate modifications and adaptations.

I claim:

1. A wrap-around type lifter utensil of adjustable girth for use with meats and poultry of various sizes in the roasting thereof comprising a pair of flat, fairly rigid, generally rectangular latticed supports adapted to be placed side by side under the meat for support thereof in a roaster pan, one support having extending inwardly from its opposite ends a pair of elongated spaced parallel projections, the other support having extending inwardly from its opposite ends a pair of elongated more widely spaced parallel projections between which the first named projections are adapted to fit, each projection having a plurality of holes provided therein spaced longitudinally thereof and coaxially aligned with holes in the other projection of the pair, an elongated pin entered selectively in whatever coaxially aligned holes of one pair of projections are registered with coaxially aligned holes in the other pair of projections, whereby the lifter utensil is adjustable in girth to fit different sizes of roasts, and articulated wrap-around extensions on the outer sides of said latticed supports adapted to be extended upwardly from the supports on opposite sides of the meat and inwardly over the top for interconnection and grasping in one hand of an operator for the lifting of the meat and placing with the lifter in a roaster pan and the subsequent removal therefrom.

2. A utensil as set forth in claim 1 wherein the pin is entirely removable for the further purpose of facilitating withdrawal of the disconnected halves of the lifter assembly from beneath the meat laterally from opposite sides thereof, there being also means for detachably locking the pin against endwise displacement from the holes in which it is entered.

3. A utensil as set forth in claim 1 wherein each of the latticed supports is made of wire, comprising a U-shaped wire frame with substantially parallel cross-wires secured to the arms of the U, the spaced projections being defined by flattened end-portions of said arms in which the spaced holes are provided.

4. A utensil as set forth in claim 1 wherein each of the wrap-around extensions is made of wire in the form of a plurality of U-shaped wire bails, the arms of the U of each bail having looped ends for pivotally connecting one bail to a support while the cross-portion of that bail serves as a handle, adjacent bails having the arms of one pivotally connected at their ends to the cross-portion of the next bail, the cross-portion of each bail adapted to serve as a handle, the utensil including means for detachably connecting the outermost bail of one set of bails with the outermost bail of the other set of bails so that their cross-portions serving as handles are juxtaposed for grasping in one hand.

References Cited in the file of this patent
UNITED STATES PATENTS

| | | |
|---|---|---|
| 2,297,332 | Stewart | Sept. 29, 1942 |
| 2,703,046 | Ahlquist | Mar. 1, 1955 |